(12) United States Patent
Williams (10) Patent No.: US 8,100,404 B2
(45) Date of Patent: Jan. 24, 2012

(54) LEAF SEAL ARRANGEMENT

(75) Inventor: David S Williams, Chesterfield (GB)

(73) Assignee: Rolls-Royce PLC, London (GB)

( * ) Notice: Subject to any disclaimer, the term of this patent is extended or adjusted under 35 U.S.C. 154(b) by 224 days.

(21) Appl. No.: 11/808,551

(22) Filed: Jun. 11, 2007

(65) Prior Publication Data

US 2008/0007009 A1 Jan. 10, 2008

(30) Foreign Application Priority Data

Jul. 7, 2006 (GB) .................................. 0613543.8

(51) Int. Cl.
*F16J 15/08* (2006.01)
(52) U.S. Cl. ...................................................... 277/355
(58) Field of Classification Search .................. 277/355, 277/411, 417, 543, 303, 592, 593
See application file for complete search history.

(56) References Cited

U.S. PATENT DOCUMENTS

| 6,267,381 B1 * | 7/2001 | Wright .......................... 277/355 |
| 2003/0071423 A1 | 4/2003 | Urlichs |
| 2007/0085277 A1 * | 4/2007 | Rhodes et al. ................. 277/355 |

FOREIGN PATENT DOCUMENTS

| EP | 1 302 708 A3 | 4/2003 |
| EP | 1 365 181 A3 | 11/2003 |
| EP | 1 777 445 A1 | 4/2007 |
| JP | 2005233020 A * | 9/2005 |
| WO | WO 01/59338 A1 | 8/2001 |
| WO | WO 2006/061324 A1 | 6/2006 |

* cited by examiner

*Primary Examiner* — Gilbert Lee
(74) *Attorney, Agent, or Firm* — Oliff & Berridge, PLC (57) ABSTRACT

In order to provide simpler manufacture and lift up and blow down control, leaf elements are provided which have profile edges arranged to associate with each other in order to create a ring carousel, either about the front or rear edge of a leaf seal arrangement. In such circumstances gas flow through the leaf seal arrangement encounters the profile edge in order to adjust leaf section position for appropriate sealing efficiency.

17 Claims, 5 Drawing Sheets

LEAF SEAL ARRANGEMENT

The present invention relates to leaf seal arrangements and more particularly arrangements used in gas turbine engines.

FIELD OF THE INVENTION

It is known that it is necessary to provide means for sealing of gases in secondary air systems of gas turbines and other arrangements. Traditionally this has been performed using bristle type seal arrangements but more recently leaf seals have been used which comprise a leaf pack formed from a number of leaf elements held together between a front and a rear plate. The plates provide a blockage to the axial air flow while assisting the radial positioning of the leaf seal elements by turning the flow such that the leaves achieve "blow down" or "lift up" relative to the rotor in order to accommodate for eccentricities in rotation.

Leaf seal arrangements have developed on and from the strength of the sealing benefits offered by brush seals in terms of a close clearance but still radially compliant seal. However, the disadvantage of brush seal bristles is that at high differential pressures, at which condition seals are most advantageous, the bristles exhibit two behaviours which limit their life. One problem is blow down, which can cause the bristles to rub hard on a rotating surface. Another problem is the tendency of the pressure force to lock the bristles against the seal backing ring which stops them from moving to accommodate for rotor excursions. Both these disadvantages give rise to premature wear of a seal arrangement and therefore significantly reduce that seal arrangement's effective life.

Leaf seal arrangements have been designed to at least relieve some of the tendencies and inadequacies with respect to bristle seal arrangements. In leaf seal arrangements metal leaves are utilised to provide the sealing effect. These metal leaves are compliant in a radial direction but stiff in an axial direction which greatly reduces the tendency of the individual seal elements to lock in position as pressure increases.

As indicated above, leaf seal arrangements generally comprise a large number of metal seal elements secured together in packs within a housing to present edges towards a rotating surface. In such circumstances it will be appreciated that there are significant requirements with respect to accurate assembly of the leaf elements and as indicated above, it is desirable to control the blow down and lift up aspects of seal operation in order to achieve best sealing effect.

SUMMARY OF THE INVENTION

In accordance with the present invention there is provided a leaf for a leaf seal arrangement, the leaf comprises a leaf section and an edge profile, the edge profile is formed to deviate from the plane of the leaf section and to react in use with an air flow over the leaf section to cause displacement of the leaf section.

Typically, the edge profile extends only partially along an edge of the leaf section. Generally, the edge profile is integrally formed with the leaf section. Advantageously, the edge profile is associated with the leaf section through a curved junction.

Possibly, the leaf has an edge profile upon opposed front and rear edges of the leaf section.

Normally, the leaf incorporates a spacer upon a top edge of the leaf.

Also in accordance with the present invention there is provided a leaf seal arrangement comprising a plurality of leaves, each leaf having a leaf section and an edge profile formed to deviate from the leaf section, the leaves juxtaposed with association between the edge profiles to form a ring carousel.

Typically, the edge profiles only extend partially along one edge of the leaf section.

Typically, the leaves include edge profiles on both the front and rear sides of the leaf sections.

Generally, the leaves incorporate a spacer.

Potentially, the arrangement incorporates a separate backing ring.

Typically, the edge profile is angular and increases in width from one end to the other to provide for annular assembly within the seal arrangement.

Generally, the edge profile is a fin. Typically, the fin is integrally formed with the leaf section. Generally, a junction between the leaf section and the edge profile is curved. The radius of curve will be dependent upon manufacturing method and tooling used. Thus, a leaf may be stamped, so the radius is dependent upon the shape of the stamping tool.

Generally, the edge profile in adjacent leaves are configured to provide an interference seal gap to regulate air flow in use across the leaves. Typically, the seal gap is defined to utilise air flows across the leaves for deflection in blow down or lift up of the leaves in operation.

Further in accordance with the present invention there is provided a method of forming a leaf for a seal arrangement, the method comprising taking a leaf of desired size and forming an edge profile with deviation from substantially the plane of a leaf section formed in the leaf.

Additionally, in accordance with the present invention there is provided a method of forming a leaf arrangement comprising forming a leaf with an edge profile with deviation from a leaf section, assembly of a plurality of leaves with edge profiles adjacent one another to form a ring carousel and securing the leaves together to retain association of the edge profiles in the ring carousel with a seal gap between adjacent leaves.

Embodiments of the present invention will now be described by way of example and with reference to the accompanying drawings in which:

DETAILED DESCRIPTION OF EMBODIMENTS

As indicated above, generally leaf seals previously have been formed to be assembled in an appropriate housing with a backing plate and a front plate in an assembly which can be cumbersome. These arrangements generally provide fixed flow apertures and pathways. In accordance with one aspect of the present invention as previously described a plurality of leaf seals are aligned axially in the direction of a potential gas flow in order to form a seal. The seal elements are profiled along at least one edge such that a fin or rib is formed which extends from a working leaf section which is generally flat and planar. As indicated, a number of these leaf elements are then associated together such that the edge profiles are adjacent to each other to define a seal ring carousel which extends between the seal elements in order to create a notional ring. As will be described later, the leaf elements, and in particular, the profile edge can be formed by stamping or crimping or etching as required. To facilitate operation the profile edge does not normally extend to the bottom or tip sealing edge of the leaf element in order to facilitate gas flow across the leaf element necessary for blow down or lift up. It will also be understood that lack of the profile edge at the bottom or tip of the leaf element means that the inner portion adjacent to a rotating surface of the leaf element remains flexible and can therefore accommodate radial excursions between the rotor and a leaf element pack formed into the leaf seal arrangement.

Figure 1:
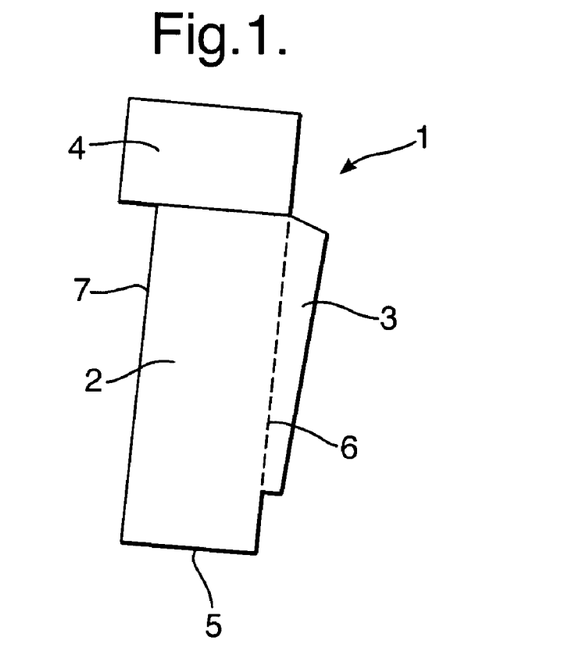
FIG. 1 provides a schematic side view of the first embodiment of a seal in accordance with the present invention prior to forming an edge profile. The leaf is flat at this stage, and the required angles of the edge profile are shown.
Figure 2:
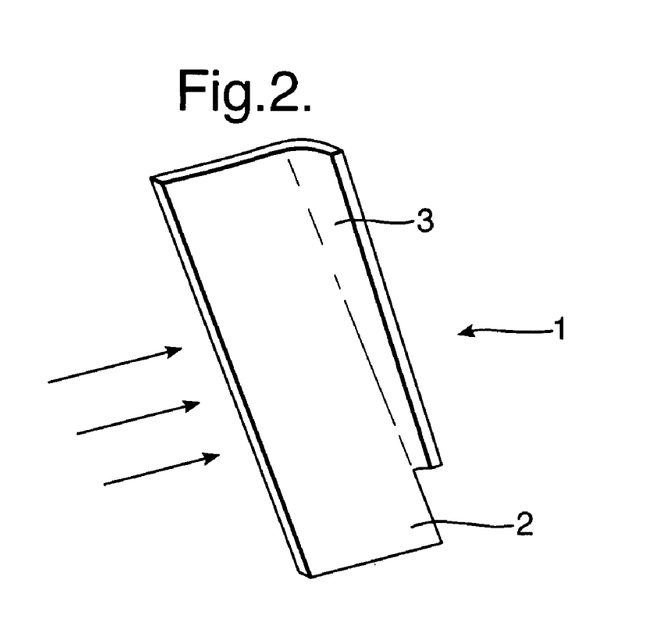
FIG. 2 is a schematic perspective view of the leaf depicted in FIG. 1 with its spacer section removed.

FIGS. 1 and 2 respectively illustrate a schematic side view and perspective view of a leaf element in accordance with one aspect of the present invention. Thus, the leaf element 1 comprises a leaf section 2 with an edge profile 3 and spacer section 4. The leaf section 2 is effectively the active seal portion of the leaf 1 with a bottom or tip edge 5 presented in use adjacent to a rotating surface. FIG. 1 shows a leaf after etching has been completed but before a forming process. Thus, at this stage the element is flat. FIG. 2 shows a leaf after forming with the projection or edge profile 3 bent. It will be understood that the angles of the top and right-hand edges of the projection or the edge profile 3 are important so that the correct shape is formed as shown in FIG. 2.

The spacer section 4 acts to provide a mounting part into a housing for the leaf 1 and also to ensure when a plurality of leaf elements 1 are secured together that there is a gap or space between those leaf elements 1. The spacer section 4 is removed for clarity in the schematic perspective view depicted in FIG. 2.

One aspect of the present invention provides the profile edge 3 which, as can be seen, does not extend completely to the tip edge 5 and therefore the leaf section 2 in this area will still be relatively compliant and able to adjust for a seal arrangement as well as rotating surface excursions. The profile edge 3 in the embodiment depicted in FIGS. 1 and 2 is at a rear or back side edge 6 of the leaf section 2, but as will be described later edge profiles in accordance with this aspect of the present invention may be provided along the front edge 7 as well.

As can be seen, the profile edge 3 is generally integral with the leaf section 2 and the junction between them is curved for aerodynamic effects.

It will be noted that the leaf section 2 is generally planar and in such circumstances the profile edge 3 is configured to deviate from the plane of the leaf section 2. It is this deviation which creates a ring carousel formed by juxtaposed or overlapping edge profiles which creates the seal arrangement effects as described below.

Each leaf element 1 is generally formed to an appropriate size and dimensions by stamping, crimping or through use of any other forming processing including etching in order to create the individual leaf 1 shapes as required for a particular leaf seal arrangement. In such circumstances it will be understood that the width, depth and thickness of the leaf section 2 may be chosen in order to achieve best sealing effect in terms of flexibility in the seal arrangement whilst the thickness of the spacer section 4 will be similarly decided in order to achieve the correct spacing for a seal gap between adjacent leaves 1 in use. The profile edge 3 will be shaped to create the ring carousel as described by juxtaposed or overlapping sections, again with a seal gap between them which acts as an interference to flow directly across the leaf element 1.

Figure 3:
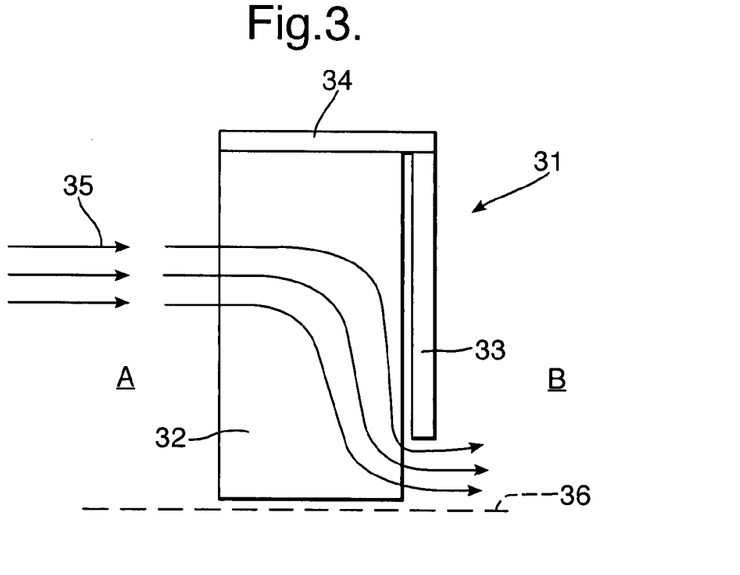
FIG. 3 is a schematic side view illustrating a blow down condition for a leaf seal arrangement.

As indicated above, a major concern with regard to any seal is its endurance in terms of wear resistance. Such wear resistance is affected by blow down and lift up of the leaf element as a result of air flow from the high pressure side to the low pressure side of the seal arrangement. FIG. 3 provides a schematic illustration of a leaf seal arrangement 31. The arrangement 31 comprises a plurality of leaf elements 32 which will be arranged in a housing comprising the backing plate 33 and mounting 34 for a spacer end of the seal elements 32. It will be appreciated that a large number of seal elements will normally be combined in tufts or otherwise to generally create an annular seal around a rotating surface of a shaft or similar rotating component. The seal arrangement 31 is arranged on the shaft to divide a high pressure side A from a low pressure side B. In such circumstances it will be appreciated that there is an axial air flow in the direction of arrowheads 35. This air flow 35 will pass through the seal gaps between the leaf elements 32. If the backing plate 33 is completely solid it will be understood that the wide flow aperture at the front end of the arrangement 31 is compressed to pass through the narrower gap at the back of the arrangement below the backing plate 33 and therefore this flow will cause forceful movement of the leaf elements 32 downwards into engagement with a rotating component surface shown by broken line 36.

As indicated above, generally the leaf elements are arranged to provide an annular seal and therefore the leaves of the leaf elements are arranged in a ring. Generally, as can be seen in FIG. 4, the leaf elements are angularly presented to the rotating surface 46 thus if the elements 42 were blown down it will be understood that tip ends 45 would be forced into contact with the rotating surface 46 and wear.

Figure 4:
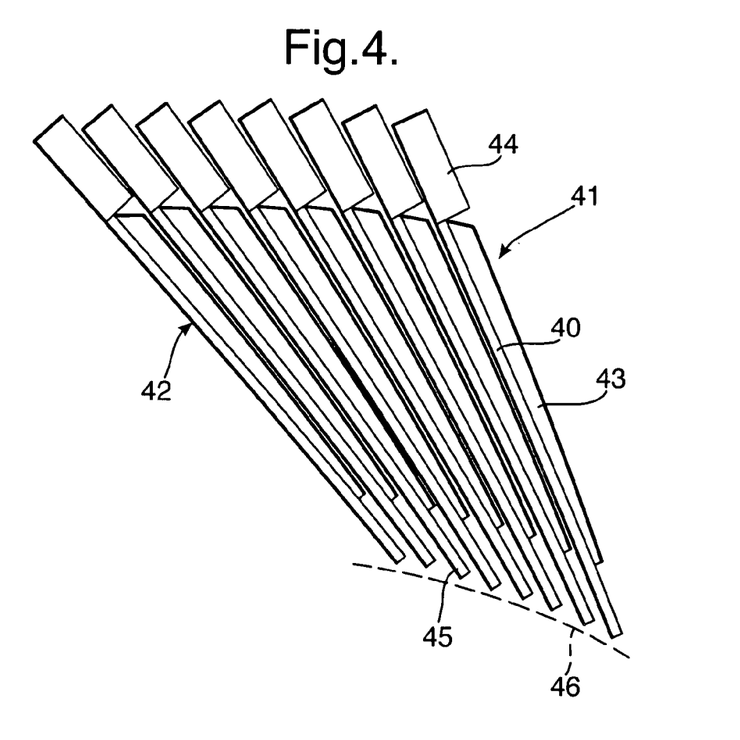
FIG. 4 provides a schematic side view of a leaf seal arrangement in accordance with the present invention.

FIG. 4 shows a schematic cross section of a proportion of a leaf seal arrangement 41 in accordance with one aspect of the present invention. Thus, the leaf elements 42 include leaf sections 40 which have a profile edge 43 and a spacer end 44. As can be seen, the individually formed leaf elements 41 are arranged such that in this particular embodiment, the trailing edge incorporates the profile edge 43. The leaf elements 41 are arranged in juxtaposed position with spacer elements 44 engaging each other such that there is a seal gap between the leaf sections 40 but more importantly in accordance with one aspect of the present invention, the profile edges are arranged in a close packed juxtaposed or slightly overlapping configuration such that there is close to a complete backing ring formed by the association between the profile edge 43. In such circumstances it will be appreciated that a separate backing ring similar to that described in FIG. 3 with regard to the ring 33 is not required.

The amount of axial gas flow leakage is limited by the interference between the profile edges 43. Furthermore, any gas flow is directed as required in order to provide a sealing effect.

Normally the profile sections 43 will be arranged to turn and deviate from the plane of the leaf section 40 through 90°, although some other angle to facilitate closure between the adjacent leaf elements 42, that is to say to reduce the seal gap between the leaf elements 40 can be achieved.

The profile edges 43 as can be seen, do not extend completely or along one edge or side of the leaf element 40, and therefore the tip edges 45 remain relatively compliant to provide good sealing function. It will be understood that the actual proportion of the length of the leaf elements 42 taken by the profile edges 43 will depend upon operational requirements.

Figure 5A:
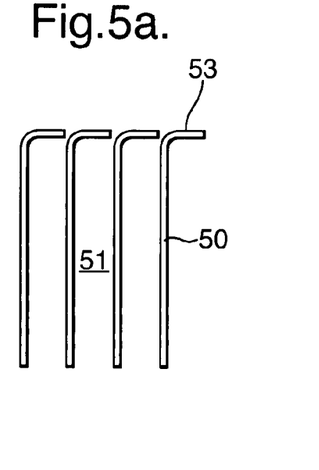
FIG. 5 provides schematic illustrations of alternative edge profile ring carousel sections in accordance with the present invention.
Figure 5B:
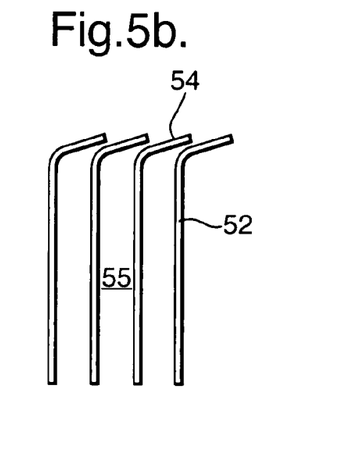

FIG. 5 illustrates respectively in FIG. 5a and FIG. 5b cross sections of leaf elements 50 and 52 with profile ends 53 and 54 arranged to create an interference ring carousel formed by juxtaposed (profile) edges 53 and overlapping (profile) edges 54 in order to create respective ring carousels to act as a backing ring for a seal arrangement. As can be seen the seal gap between the leaf elements 50, 52 in the respective configurations shown in FIGS. 5a and 5b are therefore altered. In such circumstances the gap 51 is wider than the gap 55 to allow for differing gas flow and so "blow down" and "lift up" characteristics.

Figure 6:
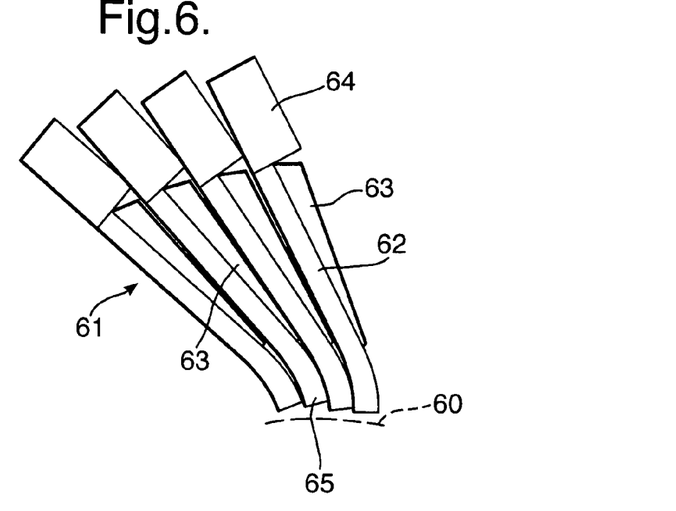
FIG. 6 illustrates a leaf seal arrangement in accordance with the present invention in normal operational condition.

The profile edges in accordance with some aspect of the present invention provide means for accommodating lift up and blow down effects upon a seal arrangement. Thus, as depicted in FIG. 6 leaf elements 61 comprise spacers 64 which are mounted appropriately to present leaf elements 62 with profile edges 63 arranged to create a ring carousel formed by juxtaposed or overlapping with adjacent leaf elements 61. The situation depicted in FIG. 6 is that in normal running conditions with an appropriate seal gap between the leaf elements 61 and therefore the tip edges 65 of the leaf elements 62 are appropriately presented towards a rotating surface 60. In such circumstances a seal arrangement is operating in accordance with expected criteria.

It will be understood that seal arrangements as indicated may be subject to lift up or blow down as a result of pressure differentials across the seal arrangement. Thus, as depicted in FIG. 7 the seal elements 61 are subject to lift up so that the profile edges 63 are brought into closer association reducing the amount of flow through the interference seal gaps between the profile edges 63.

Figure 8:
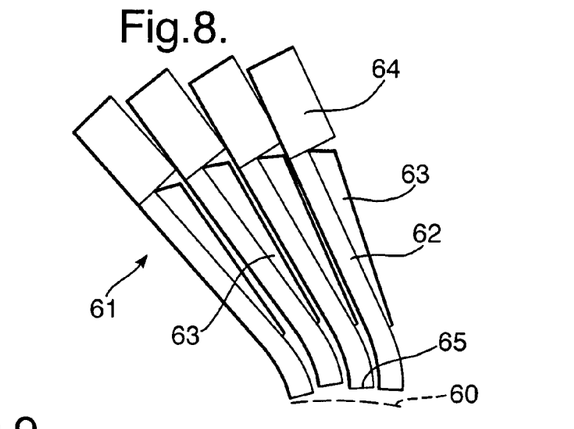
FIG. 8 is a schematic side view of a leaf seal arrangement in accordance with the present invention experiencing excessive blow down.

In FIG. 8 a situation of excessive blow down is illustrated with the leaf seal elements 61 as a result of pressure differentials across the seal arrangement. In such blow down situations the profile edges 63 open in order to allow more gas flow through the interference seal gap between these juxtaposed profile edges 63 in order to relieve the pressure differential.

In such circumstances, as indicated, the profile edges 63 in accordance with one aspect of the present invention provides an effective backer ring for a seal arrangement but can accommodate for lift up and blow down. Nevertheless, in order to accommodate these displacements of the profile edges, it will be understood that the profile edge is cut away below the spacer section 64 in order to avoid clashing with that spacer section 64 when subject to radial excursions.

Figure 7:
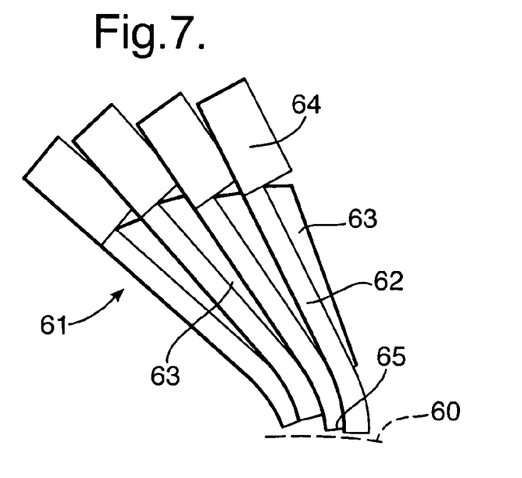
FIG. 7 depicts a leaf seal arrangement in accordance with the present invention when experiencing excessive lift up.

It will also be noted in FIGS. 6 to 7 that the tip edges 65 of each leaf section 62 touch at their ends. In such circumstances the leaf elements 62 are curved to provide such engagement at their tip ends.

As indicated above, the present leaf seals have the ability to provide passive control of the position of the leaf elements 62 during operation and hence hold them in an optimum position relative to a rotating surface 64. During normal running the leaf elements 62 are arranged as indicated and shown in FIG. 6. However, when excessive lift up as depicted in FIG. 7 is presented then the backing ring section cannot produce the necessary amount of leakage at the rear portion of the leaf seal arrangement and this compensates by forcing blow down of the leaf elements 62. Similarly, when the leaf elements 62 are subject to blow down as depicted in FIG. 8 the profile edges in forming a ring carousel open up with a resulting increased gas flow leakage and therefore compensating lift up to the desired operational position depicted in FIG. 6. In such circumstances as indicated there is passive control with regard to seal arrangement operation which results in minimised leakage whilst ensuring the leaf tips 65 are efficiently presented to reduce excess wear.

Figure 9:
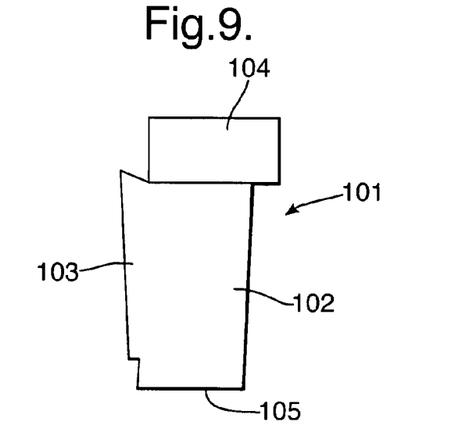
FIG. 9 is a schematic side view of a leaf in accordance with the present invention with a front edge profile.
Figure 10:
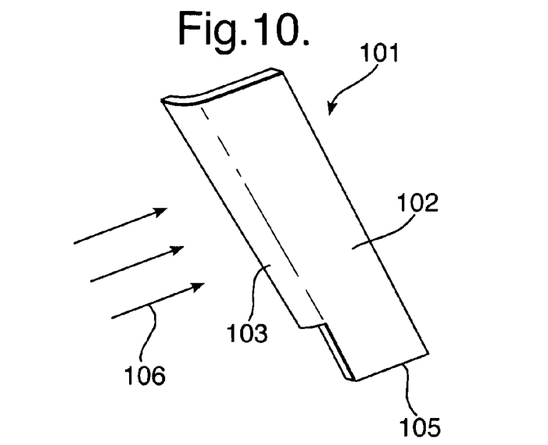
FIG. 10 is a schematic perspective view of the leaf depicted in FIG. 9 in a lift up configuration and with the spacer section removed.
Figure 11:
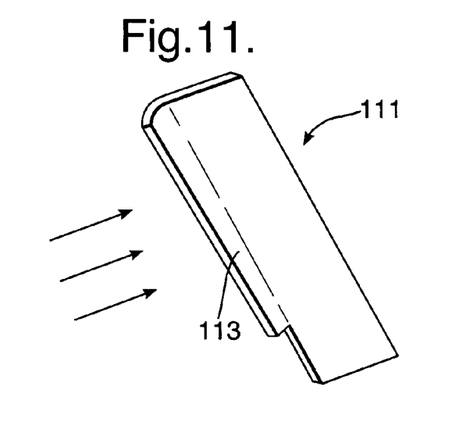
FIG. 11 is a schematic perspective view of the leaf depicted in FIG. 9 in a blow down configuration and with the spacer section removed.

As indicated above, generally the profile edges in accordance with the present invention will be utilised in order to create a ring carousel which acts as a backing ring for a leaf seal arrangement. However, as depicted in FIGS. 9 to 11, it is possible to create a profile edge at a leading edge of leaf elements in accordance with the present invention. These profile edges as previously, will be created by crimping or stamping or etching a portion of the leading edge of the leaf elements such that there is an integral front ring to the leaf seal assembly.

FIG. 9 illustrates a side view of a leaf element 101 before forming/stamping in which a leaf section 102 has a profile edge 103 with a spacer section 104 at one end and a tip edge 105 at the other. In such circumstances, as previously the leaf section 102 presents the tip 105 to provide a seal in association with a plurality of other seal elements 101 in an appropriate leaf seal arrangement. The profile edge 103 as indicated above is at the front side of the leaf element 10 and therefore can be utilised to appropriately present the leaf section 102.

FIG. 10 provides a schematic perspective view of the leaf element 101 depicted in FIG. 9 when subject to an axial gas flow in the direction of arrowheads 106. Thus, the effect of this flow will be to cause lift up of the leaf element 101 in use. It will be noted in the depiction of FIG. 10 the spacer element 104 is removed for clarity.

An alternative to creating the front profile edges 103 depicted in FIGS. 9 and 10, and a situation where there is lift up is to alter the direction of the profile edge in order to generate blow down of the seal edge. This is achieved by providing an edge profile which deviates from the plane of the seal element in the opposite direction to that depicted in FIG. 10. Thus, as depicted in FIG. 11 the air flow engages a leaf element 111 on an opposite side to that of the element 101 depicted in FIG. 10. In such circumstances deflection of the leaf element 111 will be downward. By appropriate orientation of the respective profile edges 103 and 113 there can be adjustment to compensate for different operational conditions.

The leaf elements 101 and 111 depicted in FIGS. 9 to 11 present to a curved leading profile edge reminiscent of an aerofoil. In such circumstances there is lift up or blow down facilitated by reducing the dynamic pressure across the curved surface. In such circumstances by choosing the direction in which the front profile edge sections 103, 113 which form the ring carousel curve it is possible to predetermine a lift up or blow down characteristic for the leaf element 101, 113 pack.

Figure 12:
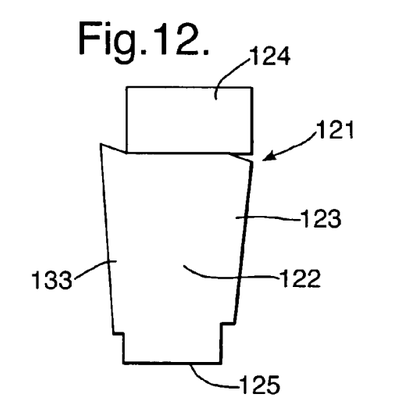
FIG. 12 is a schematic side view of a leaf incorporating front and rear profile edges in accordance with the present invention.
Figure 13:
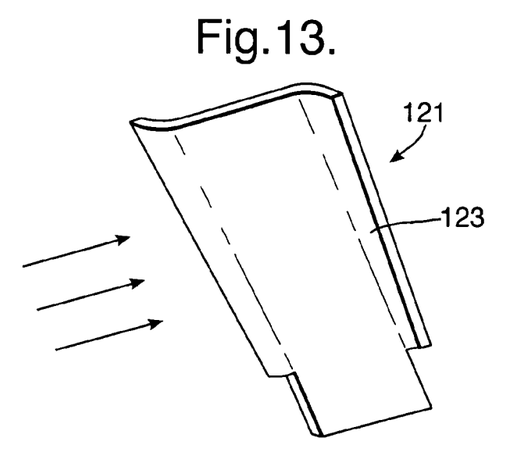
FIG. 13 is a schematic perspective view of the leaf depicted in FIG. 12 with its spacer section removed; and, FIG. 14 is a schematic perspective view of leaf elements in accordance with the present invention associated with a conventional backing ring and with their spacer elements removed.

It will be understood that profile edges in accordance with the present invention may be provided at both the front and the rear edges of the leaf elements. Such a situation is depicted in FIGS. 12 and 13 in which a leaf element 121 has a leaf section 122 with respective front and rear edges provided by profile edges 123, 133 in order to create the aerofoil and backing ring effects described above for operational control in a leaf seal arrangement as described above. In such circumstances, a bottom tip edge 125 is appropriately presented to a rotating surface to provide a seal. A spacer section 124 is again provided and depicted in FIG. 12 but omitted from FIG. 13 for clarity. In such circumstances as previously, a leaf pack can be created by a number of leaf elements 121 appropriately secured together with seal gaps between. It will be understood that the curvature of the front and rear profile edges 123, 133 can be in either direction and will depend upon the overall sealing characteristics required.

Figure 14:
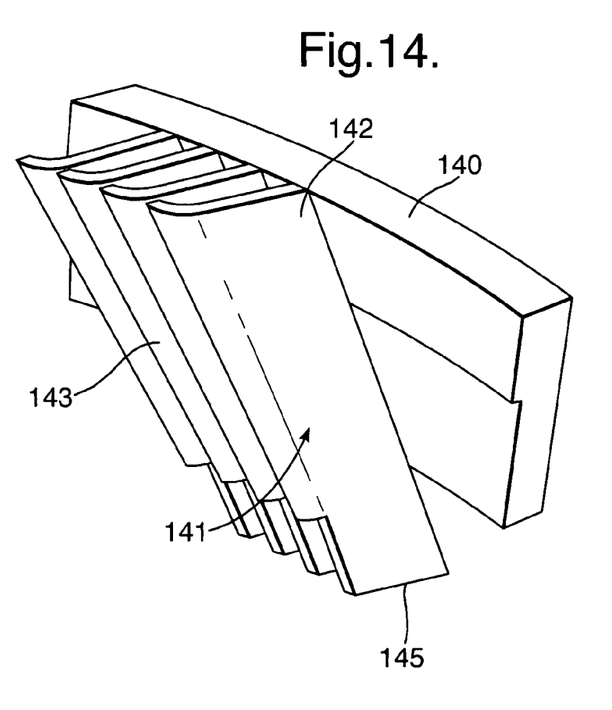

It will be understood that the present seal leaves can be associated with a conventional backing ring. Thus, as depicted in FIG. 14 leaf elements 141 in accordance with one aspect of the present invention are associated with a separate backing ring 140. It will be appreciated that a front ring could also be provided with rear profile edges in accordance with certain aspect of the present invention creating a ring carousel as described previously in order to provide a backing ring for operational performance in a seal arrangement. Nevertheless, in the depiction of FIG. 14 the front of the seal arrangement is created by profile edges 143 which extend from leaf elements 142 to present tip edges 145 towards a rotating surface (not shown). It will also be appreciated that spacer sections will also be provided in the leaf elements 141 but these have been omitted for clarity. In such circumstances as previously a leaf seal arrangement in accordance with the depiction shown in FIG. 14 will operate in order to create a seal across a pressure gradient. An integral front ring created by the ring carousel of a number of profile elements 143 creates lift up of the leaf elements 141 and in particular the tip edges 145 whilst the conventional separate backing ring 140 acts to counter act that lift up. For the conventional backing ring 140 the axial width of the gap between the leaf trailing edge and the backing ring determines the extent to which the leaves will blow down and therefore can be adjusted for antagonistic compensation with the lift up created by the aerofoil effect of deviation by the profile edge 143 from the plane of the leaf elements 142. In such circumstances by appropriate control of the parameters, that is to say the aerofoil effect of the profile edge 143 and the configuration of the backing ring 140, it is possible to obtain optimum position for the leaf elements 141 relative to the rotor during operation.

It will be appreciated in accordance with certain aspect of the present invention leaf elements are formed by an appropriate process in order to create the profile edges. This process, as indicated previously, may be through pressing or crimping or etching to the appropriate shape. A number of such leaf elements will then be assembled into an appropriate mounting to present the leaf elements with tip edges towards a rotating surface. The degree of deviation by the profile edge away from the substantial plane of the leaf section will be determined dependent upon desired lift up or blow down characteristics. It will also be understood that the thickness of the respective spacer section, leaf section as well as the profile edge can be adjusted dependent upon operational requirements. Additionally, the profile edge as indicated above, will generally not extend fully along the edge of the leaf section in order to provide some compliance near to the tip edge and to avoid clashing during deflections in lift up and blow down near the spacer section. Such variations in thickness can be achieved through simple rolling but more typically will be achieved through etching or otherwise.

Generally, through the forming processes as described above, the profile edge will be integrally formed with the leaf section. This integral forming will, as indicated, result in a curved junction between the profile edge and the leaf section but where desired the angularity of that junction may be set for operational performance. The radius of curve will be dependent upon manufacturing method and tooling used. Thus, a leaf may be stamped, so the radius is dependent upon the shape of the stamping tool.

Generally, the profile edges will be annular and expand from the end towards the tip edge to create a wedge shape which acts through the widening circumference of the annular leaf seal arrangement to ensure that there is appropriate juxtaposed or overlapping positioning of the profile edges to create an interference seal for appropriate action.

A leaf seal arrangement in accordance with one aspect of the present invention will, as indicated above, be provided by a plurality of leaf seal elements secured together such that the profile edges encounter each other to create front or backing carousel rings adapted to adjust gas flow through the sealing arrangement for control of blown down or lift up. The leaf elements will be associated in leaf packs comprising a number of leaf elements which will then be secured appropriately in a housing in order to be positioned around a rotating shaft or other rotating surface.

I claim:

1. A leaf for a leaf seal arrangement, the leaf comprises:
   a leaf top that is a distal-most portion of the leaf in a direction away from a rotating surface;
   a leaf tip at an end opposite of the leaf top in a longitudinal direction of the leaf that is, in use, adjacent to the rotating surface;
   first and second leaf sides;
   a leaf section extending from the leaf top to the leaf tip and from the first leaf side toward the second leaf side; and
   an edge section forming at least a portion of the second leaf side extending between the leaf top and the leaf tip,
   wherein a whole of the edge section is formed to turn and deviate from a plane of the leaf section to react in use with an air flow over the leaf section to cause displacement of the leaf section.

2. A leaf as claimed in claim 1 wherein the edge section extends only partially along the second leaf side.

3. A leaf as claimed in claim 1 wherein the edge section is integrally formed with the leaf section.

4. A leaf as claimed in claim 1 wherein the edge section is associated with the leaf section through a curved junction.

5. A leaf as claimed in claim 1 wherein the leaf has another edge section forming at least a portion of the first leaf side.

6. A leaf as claimed in claim 1 wherein the leaf incorporates a spacer upon the leaf top.

7. A leaf seal arrangement comprising a plurality of leaves, each leaf having:
   a leaf top that is a distal-most portion of the leaf in a direction away from a rotating surface;
   a leaf tip at an end opposite of the leaf top in a longitudinal direction of the leaf that is, in use, adjacent to the rotating surface;

first and second leaf sides;
a leaf section extending from the leaf top to the leaf tip and from the first leaf side toward the second leaf side; and
an edge section forming at least a portion of the second leaf side and extending between the leaf top and the leaf tip, wherein a whole of the edge section is formed to turn and deviate from a plane of the leaf section, and
the plurality of leaves are juxtaposed with association between the edge sections to form a ring carousel.

8. An arrangement as claimed in claim 7 wherein the edge sections only extend partially along respective second leaf sides.

9. An arrangement as claimed in claim 7 wherein the plurality of leaves include edge sections on at least a portion of the first leaf sides.

10. An arrangement as claimed in claim 7 wherein the plurality of leaves incorporate spacers.

11. An arrangement as claimed in claim 7 wherein the arrangement incorporates a separate backing ring.

12. An arrangement as claimed in claim 7 wherein the edge section is angular and increases in width from one end to another to provide for annular assembly within the seal arrangement.

13. An arrangement as claimed in claim 7 wherein the edge section is a fin.

14. An arrangement as claimed in claim 13 wherein the fin is integrally formed with the leaf section.

15. An arrangement as claimed in claim 7 wherein a junction between the leaf section and the edge section is curved.

16. An arrangement as claimed in claim 7 wherein the edge sections in adjacent leaves are configured to provide an interference seal gap to regulate air flow in use across the leaves.

17. An arrangement as claimed in claim 16 wherein the seal gap is defined to utilise air flows across the leaves for deflection in blow down or lift up of the leaves in operation.

* * * * *